United States Patent
Bell

(10) Patent No.: US 10,938,211 B2
(45) Date of Patent: Mar. 2, 2021

(54) INTEGRATED VEHICLE-TO-HOME ENERGY MANAGEMENT SYSTEM

(71) Applicant: FORD GLOBAL TECHNOLOGIES, LLC, Dearborn, MI (US)

(72) Inventor: Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 16/198,094

(22) Filed: Nov. 21, 2018

(65) Prior Publication Data

US 2020/0161859 A1    May 21, 2020

(51) Int. Cl.
| | |
|---|---|
| *B60L 11/18* | (2006.01) |
| *H02J 3/14* | (2006.01) |
| *B60L 53/63* | (2019.01) |
| *B60K 6/28* | (2007.10) |
| *H02J 3/00* | (2006.01) |

(52) U.S. Cl.
CPC ............ *H02J 3/14* (2013.01); *B60L 53/63* (2019.02); *B60K 6/28* (2013.01); *B60Y 2200/91* (2013.01); *B60Y 2200/92* (2013.01); *B60Y 2300/91* (2013.01); *H02J 3/003* (2020.01); *H02J 2310/14* (2020.01)

(58) Field of Classification Search
CPC ........ B60K 6/28; H02J 2310/14; H02J 3/003; H02J 3/14; B60L 53/63; B60Y 2300/91; B60Y 2200/92; B60Y 2200/91
See application file for complete search history.

(56) References Cited

U.S. PATENT DOCUMENTS

| | | | |
|---|---|---|---|
| 8,860,361 B2 | 10/2014 | Fukuzawa | |
| 8,866,438 B2 | 10/2014 | Lee et al. | |
| 8,872,379 B2 | 10/2014 | Ruiz et al. | |
| 2012/0150359 A1* | 6/2012 | Westergaard | G06Q 10/06313 700/291 |
| 2014/0111006 A1* | 4/2014 | Baldassarre | H02J 9/06 307/23 |
| 2014/0312841 A1* | 10/2014 | Baba | B60L 58/12 320/109 |
| 2015/0039391 A1* | 2/2015 | Hershkovitz | G06Q 30/0202 705/7.31 |
| 2016/0207409 A1* | 7/2016 | Ueo | B60L 7/14 |
| 2017/0043671 A1* | 2/2017 | Campbell | G01C 21/34 |
| 2018/0039244 A1* | 2/2018 | Son | G05B 19/042 |
| 2020/0023747 A1* | 1/2020 | Logvinov | B60L 53/305 |

* cited by examiner

*Primary Examiner* — Carlos Amaya
*Assistant Examiner* — Esayas G Yeshaw
(74) *Attorney, Agent, or Firm* — Brooks Kushman, P.C.

(57) ABSTRACT

A vehicle includes a power system that is couplable to a power network. A controller is configured to communicate with appliances coupled to the power system and programmed to operate the appliances to prevent current demand of the appliances from exceeding a peak operating current of the power system and to balance current demand to prevent exceeding a nominal current rating of the power system for more than a predetermined time.

16 Claims, 5 Drawing Sheets

INTEGRATED VEHICLE-TO-HOME ENERGY MANAGEMENT SYSTEM

TECHNICAL FIELD

This application generally relates to a system for managing energy transfer between a home and a vehicle.

BACKGROUND

Network-equipped household appliances are becoming more prevalent in homes. Connected appliances allow for enhanced features and improved control. For example, remote access for activating and deactivating features and receiving operational status provide benefits to consumers. Electrified vehicles are also becoming more widely available. Electrified vehicles can be connected to the same household power system as the appliances. In addition, electrified vehicles can be used in some cases to supply power to the household power system.

SUMMARY

A vehicle includes a power system couplable to a power network. The vehicle includes a controller configured to communicate with appliances coupled to the power system and programmed to, responsive to the power system providing a current and one of the appliances requesting a change in current demand predicted to cause the current to exceed a peak current limit of the power system, operate the appliances to prevent the current from exceeding the peak current limit.

Each of the appliances may be associated with a priority level. The controller may be further programmed to operate the appliances to delay activation of the one of the appliances until the current demand predicted is less than the peak current limit responsive to the one of the appliances having a priority level that is less than other appliances. The controller may be further programmed to, responsive to the one of the appliances having a priority level that exceeds a priority level of a first appliance, reduce current to the first appliance before activating the one of the appliances. The controller may be further programmed to, responsive to the one of the appliances having a priority level that exceeds a priority level of a first appliance, suspend operation of the first appliance before activating the one of the appliances. The controller may be further programmed to, responsive to one of the appliances requesting a change in current demand predicted to cause the current to exceed a nominal current rating of the power system, schedule operation of the appliances to prevent the current from exceeding the nominal current rating for greater than a predetermined time. The controller may be further programmed to, responsive to more than one of the appliances requesting a change in current demand due to an inrush current of each of the more than one of the appliances within a predetermined time interval, sequence operation of the more than one of the appliances to balance the current demand so that only one of the appliances demands a corresponding inrush current within the predetermined time interval. The controller may be further programmed to receive one or more parameters indicative of operating power requirements for the appliances, inrush power for each of the appliances, a predicted run time for each of the appliances, a duty cycle of the appliances, and a load profile for each of the appliances. The power system may include a traction battery, and an engine coupled to an electric machine. The controller may be further programmed to, responsive to a power demand from the appliances exceeding an amount of power that can be provided by the traction battery, operate the engine and the electric machine to generate power to satisfy the power demand. The controller may be further programmed to, responsive to recognizing that the vehicle is parked in an enclosed space with a controllable door, request that the controllable door be opened while the engine is running.

A method includes operating a vehicle power system coupled to a power network to supply a current to appliances coupled to the power network. The method includes sequencing, by a controller, activation of the appliances to prevent the current from exceeding a peak current limit of the vehicle power system and to prevent the current from exceeding a nominal rated current of the vehicle power system for more than a predetermined time.

The method may further include causing, by the controller, a reduction in current demand of a first appliance responsive to a second appliance requesting an increase in the current that is predicted to cause the current to exceed the peak current limit, wherein the second appliance has a priority level that is greater than that of the first appliance. The method may further include activating, by the controller, responsive to a first appliance and a second appliance requesting activation in a same time interval, the first appliance and the second appliance such that the first appliance is activated after an inrush current of the second appliance has dissipated, wherein the second appliance has a priority level that is greater than that of the first appliance. The method may further include sequencing, by the controller, operation of the appliances to minimize time intervals in which the current is between a nominal rated current of the vehicle power system and the peak current limit. The may further include interrupting, by the controller, current demand of a first appliance responsive to a second appliance requesting activation predicted to cause the current to exceed a nominal rated current of the vehicle power system for greater than a predetermined time, wherein the second appliance has a priority level that is greater than that of the first appliance. The method may further include operating, by the controller, the appliances to minimize a peak current demand.

A vehicle power system includes power sources couplable to a power network and a controller configured to communicate with appliances connected to the power network and, responsive to the power sources providing current to the appliances and one of the appliances requesting a change in current demand predicted to cause the current to exceed a power limit of the power sources, schedule operation of the appliances to prevent the current from exceeding the power limit.

The vehicle power system may further include a traction battery coupled to an electric machine that is drivable by an engine. The controller may be further programmed to, responsive to the electric machine being operated to supply current to the power network and one of the appliances requesting a change in current demand, operate the appliances to prevent the current from exceeding a peak current limit of the traction battery and the electric machine. The controller may be further programmed to, responsive to the one of the appliances requesting a change in current demand predicted to cause the current to exceed a nominal rated current of the power sources for a predetermined time, schedule operation of the appliances to prevent the current from exceeding the nominal rated current for greater than the predetermined time. The controller may be further programmed to, responsive to the change in current demand exceeding a power limit of a traction battery while the engine is off, start the engine to drive the electric machine and command the electric machine to satisfy the current demand. The controller may be further programmed to, responsive to recognizing that the vehicle power system is located in an enclosed space with a controllable door, request that the controllable door be opened while the engine is running.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrified vehicles can be used to provide power to external devices and power networks. The system described herein improves the operation of the vehicle power system for providing power to a household power network. The system manages the power system and appliances to supply power to the home. An advantage of the disclosed system is that the home can be supplied by a vehicle power system that is not rated to carry peak transient power loads from the home. The system actively manages the household loads to prevent exceeding constraints of the vehicle power system.

Figure 1:
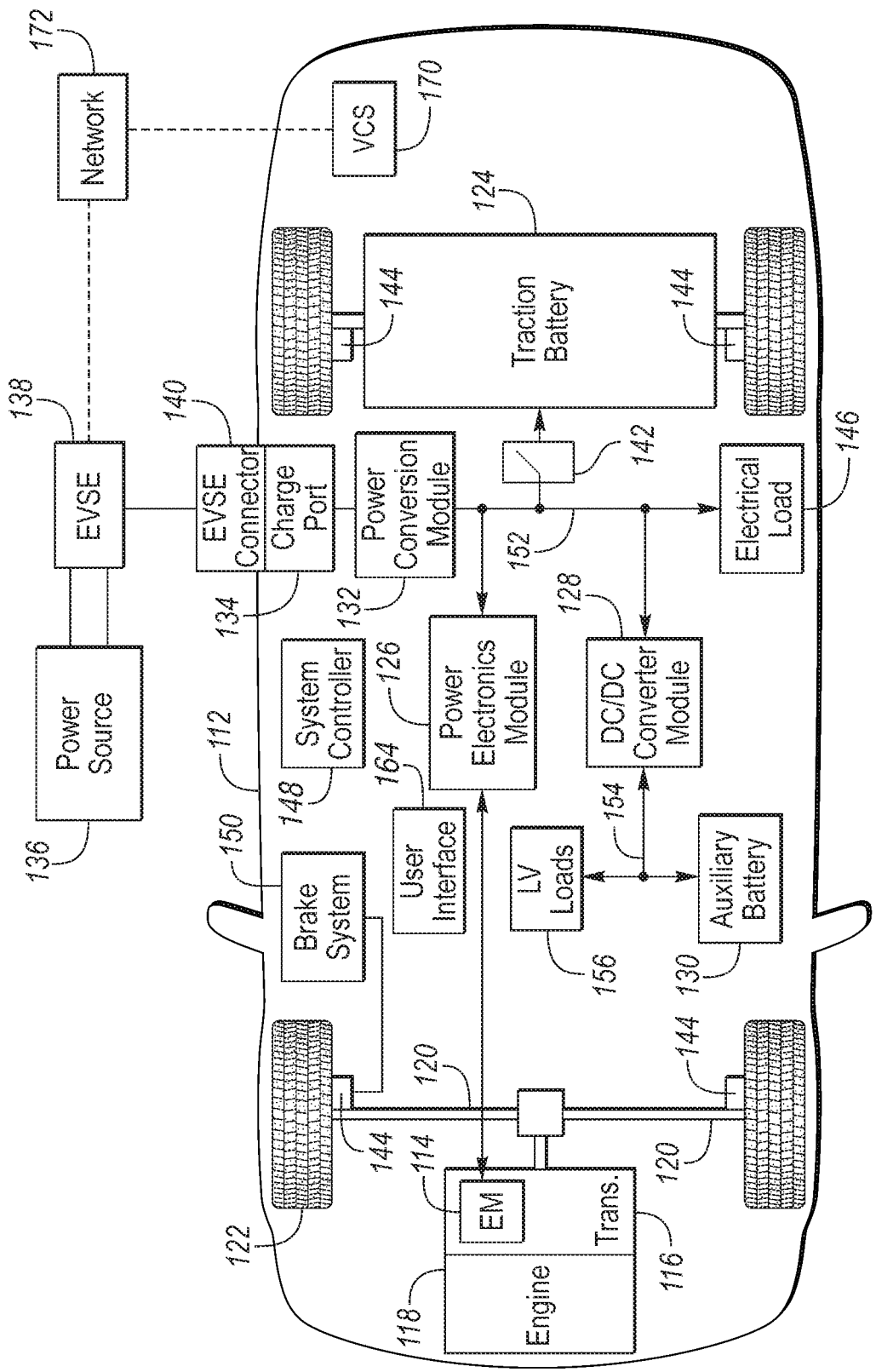
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the electrified vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The components of the vehicle 112 may comprise a vehicle power system. The vehicle power system may include those components that can be used to provide power to an external power network. For example, the vehicle power system may include the engine 118, electric machines 114, power electronics module 126, traction battery 124, the power conversion module 132 and any interconnecting components. The vehicle 112 may be further configured to supply power to external devices via the charge port 134. In this mode of operation, the vehicle power system may supply power to the external power network through the EVSE 138. The vehicle power system may supply power from the traction battery 124. The vehicle power system may also supply power from the electric machine 114 operating as a generator and driven by the engine 118.

A vehicle system controller (VSC) 148 may be present to coordinate the operation of the various components. For example, the controller 148 may manage operation of the vehicle power system. Note that operations and procedures that are described herein may be implemented in one or more controllers. Implementation of features that may be described as being implemented by a particular controller is not necessarily limited to implementation by that particular controller. Functions may be distributed among multiple controllers communicating via a vehicle network.

The electrified vehicle 112 may include one or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown but it may be implied that the vehicle network may connect to any electronic module and/or system that is present in the vehicle 112.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs. The controller 148 may receive inputs from the user interface 164 and may provide outputs to be displayed or communicated by the user interface 164.

The vehicle 112 may include a vehicle communication system (VCS) 170 that is configured to communicate to devices external to the vehicle 112. In some configurations, the VCS 170 may include a wireless network (WiFi) interface that is configured to communicate with a network router 172. The network router 172 may be compatible with an Ethernet network as defined by Institute of Electrical and Electronics Engineers (IEEE) 802 family of standards. The network router 172 may be configured to communicate with physical and wireless connections. In some configurations, the EVSE connector 140 and the charge port 134 may include connections to establish a connection (e.g., wired connection) between the network router 172 and the VCS 170. The VCS 170 may communicate to systems within the vehicle 112 via the vehicle network. The controller 148 may include an interface to the VCS 170 such that the controller 148 may receive and transmit data through the network router 172.

The controller 148 may be configured to interface with the EVSE 138. In some configurations, the interface between the EVSE connector 140 and the charge port 134 may include a communication interface between the controller 148 and the EVSE 138. In some configurations, communication with the EVSE 138 may be through the VCS 170.

The controller 148 may monitor the status of the onboard power sources (e.g., traction battery 124, engine 118). For example, the controller 148 may compute or receive a state of charge and charge/discharge power limits of the traction battery 124. The state of charge may be indicative of an amount of energy stored in the traction battery 124. The controller 148 may receive an indication of fuel level in a fuel tank. The fuel level may be indicate of an amount of energy that can be provided by the engine 118.

Electrified vehicles may be used as a power source for a building (e.g., home). In some configurations, the electrified vehicle 112 may be a backup source of power and used when the electrical transmission grid is not functioning. In some configurations, the electrified vehicle 112 may be used to satisfy peak power demands of the building. The electrified vehicle 112 may be used to store energy when rates are cheap and use the stored energy to reduce power consumption during more costly time periods. Using the electrified vehicle 112 as a home energy source presents some challenges for the vehicle power system. One challenge is setting the power and energy requirements of the vehicle power system. The vehicle power system may be sized to handle peak and nominal power requirements of the building. A home power system may be designed to handle many appliances and electrical devices operating at one time. With traditional loads, the home electrical system may be overdesigned to ensure that sufficient power is available for all systems. Components may be sized to handle all of the electrical devices operating at one time. Designing a system based on traditional peak and nominal power requirements can lead to a higher cost system.

Modern appliances may communicate with each other and other devices over an Internet of Things (IoT). The IoT may be defined as a system interconnecting various devices to permit communication and coordinated actions between the devices. IoT compatible devices allow information to be shared between devices. Sharing of information between the connected devices can improve performance of the devices. IoT connected appliances are becoming common household items. These connected devices can be used to improve performance of the vehicle power system when the vehicle 112 is used to power the home or building. The same IoT technology can be used to minimize power drawn from the vehicle power system. Further, the technology can be used to ensure that the vehicle power system can provide sufficient power to the home within the constraints of the vehicle energy storage and generation capacity.

Figure 2:
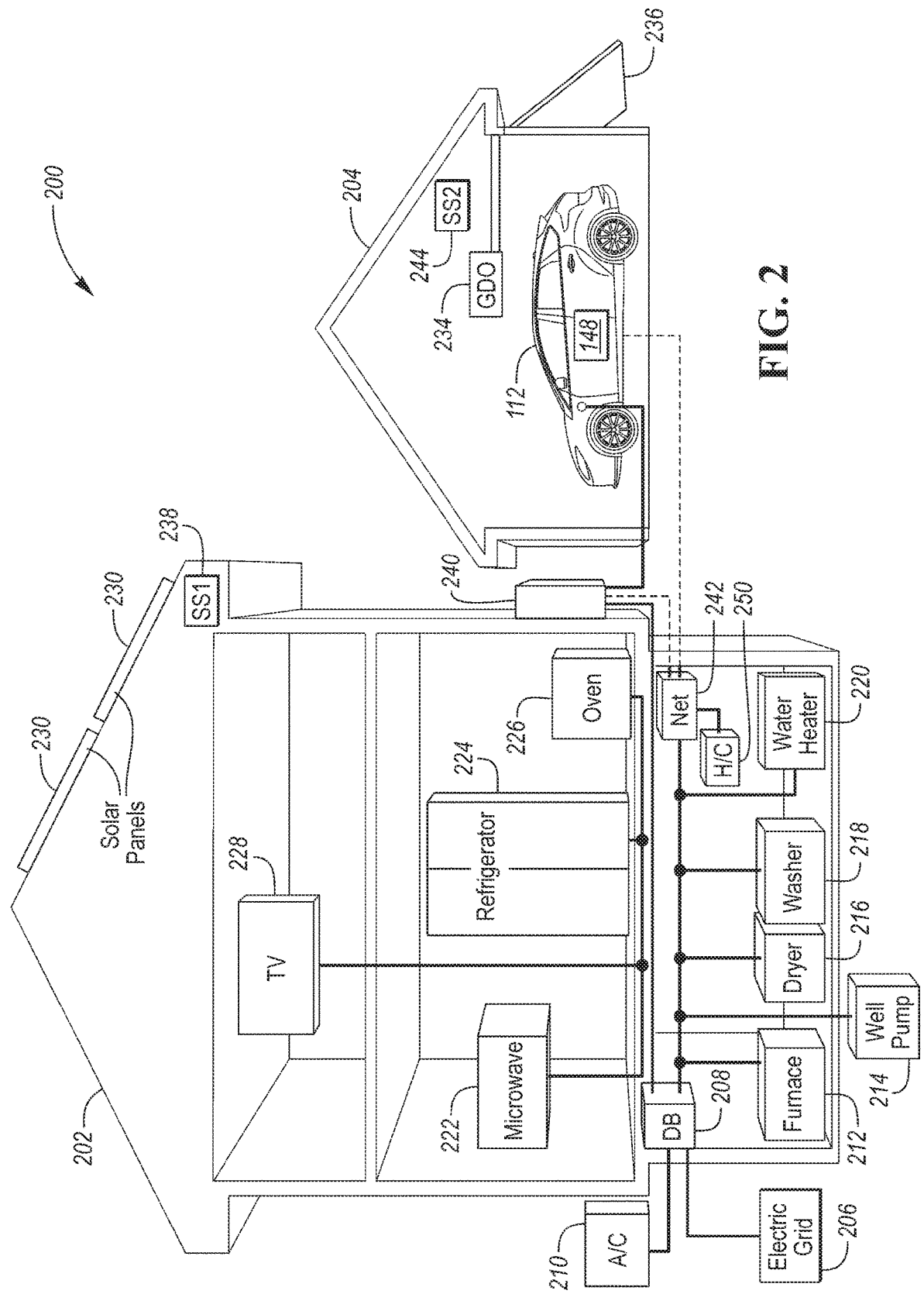
FIG. 2 depicts a possible configuration for an electrified vehicle including a vehicle power system connected to a home power network.

FIG. 2 depicts a possible configuration of a household power system 200. The household power system 200 may include structures/buildings such as a house 202 and a garage 204. The garage 204 may be attached to or separate from the house 202. The house 202 may be electrically coupled to an electrical grid 206. The electrical grid 206 may be provided by a utility or other company. The house 202 may include home power sources, such as solar panels 230, configured to provide power to the house 202 and/or the electrical grid 206. Other home power sources may include a backup generator that runs on natural gas or other fuel.

The home power sources (e.g., solar panels 230) and the electrical grid 206 may be electrically coupled to the home power network through a distribution box 208. The distribution box 208 may provide an attachment point for conductors of the electrical grid 206. The distribution box 208 may further provide connection points for conductors that are routed throughout the house 202 and garage 204 to provide electrical power. The conductors routed through the house may form a household power network. Some conductors may be routed to outlets that are configured to permit devices to be plugged in. Some conductors may be routed to devices or appliances directly (e.g., hardwired). The distribution box 208 may further include circuit breakers and/or fuses to protect wiring from over-current events. The distribution box 208 may include switches such as a main shut-off switch and/or a transfer switch.

The house 202 and related structures may further include appliances and devices that operate from electrical power. For example, the house 202 may include a water heater 220, a washer 218, a dryer 216, a furnace 212, a well pump 214, an air conditioning unit 210, a stove/oven 226, a refrigerator 224, a microwave oven 222, and a television 228. In addition, other appliances and devices without limitation may be connected to the household power network. Devices/appliances that are connected to the household power network may be referred to generically as household loads. Each of the devices/appliances may be configured to draw an amount of power from the household power network. Appliances and devices may have associated power ratings that include an operating power rating and a transient power rating. The operating power rating may be an amount of power expected during normal steady-state operation (e.g., continuous operation). The transient power rating may be an amount of power expected during transient conditions. The transient power rating may be a power level that is achieved for relatively short periods of time. For example, some appliances may include electric machines that draw more current when started (e.g., inrush current). Such appliances may draw power according to the transient power rating for a short period of time before transitioning to a power level in accordance with the operating power rating.

In a typical household power system, the household power network is operated with little knowledge of the devices that are connected. The household power system may be sized to provide a predetermined amount of power. Devices drawing power from the household power system draw power when activated. Activation of the device or appliance may be manually performed by operating a switch associated with the device. So long as the power limits of the household power system are not exceeded, the devices may operate with no issue. However, such systems may be over-sized to provide more power than is necessary to ensure that peak load conditions can be satisfied. A system having real-time knowledge of the power requirements of the loads may allow for a more effective power distribution system. Real-time knowledge of the load power requirements may allow a power system with a lower power rating to satisfactorily power the system. The household loads may be configured as IoT devices having the capability to communicate over a network.

The operation of the IoT household loads may allow improved management of the household power network. As an example, loads expected to draw large amounts of power may exchange messages on the home network before activating the load. In non-IoT configurations, activation of a load is generally immediate with no handshaking or negotiation for power resources. In the managed system, the power resources may be limited so proper sequencing and operation can ensure that power limits are not exceeded while satisfying the power demands.

The household power system 200 may further include a charger 240 that is configured to couple the household power network and the vehicle 112. The charger 240 may be configured to bi-directionally transfer power between the household power network and the vehicle 112. The charger 240 may include circuitry to convert power between the household power network and the vehicle 112. For example, the household power network may operate using alternating current (AC) power while the vehicle may require a direct current (DC) power. Depending on the transfer direction, the charger 240 may be configured to convert the power to the proper DC or AC specifications. The charger 240 may operate as described in relation to the EVSE 138 (from FIG. 1). The charger 240 may be directly connected to the distribution box 208. Further, the distribution box 208 may include transfer switches to selectively isolate the power connection between the electrical grid 206 and the charger 240.

The garage 204 may include a door 236 that is opened and closed by operation of a garage door opener 234. The garage door opener 234 may be electrically operated and may be configured to open and close via a wired and/or wireless signal. The vehicle 112 may be parked in the garage 204. For example, a charger connection may be installed in the garage 204 to be accessible by the parked vehicle. The charge connection may be a power cable that is compatible with the charge port 134 of the vehicle 112.

The house 202 may include a network router 242 that is configured to establish a home network. The home network may be a wired/wireless Ethernet network. Devices may be connected via a wire connection and/or wirelessly. The network router 242 may further include an internet connection such that devices may communicate with other systems on the world-wide web. The charger 240 may connect to the network router 242 via a wired and/or wireless connection.

In addition, the vehicle 112 may be configured to communicate with the network router 242 via the VCS 170. In some configurations, the charge connection may include an Ethernet connection that is routed to the network router 242. The vehicle 112 may establish a wireless connection and/or a wired connection to the network router 242. For example, the controller 148 may be configured to communicate with the network router 242 through the VCS 170. The controller 148 may be configured with passcodes and security keys to access the home network. The user may configure the controller 148 via the user interface 164.

The house 202 may include a security system 238 that includes sensors, actuators, and control modules for managing home security. Sensors may include motion activation sensors, door sensors, and window sensors. Actuators may include lights and alarms. The garage 204 may include a garage security system 244 that includes sensors, actuators, and control modules. The garage security system 244 may communicate and/or be integrated with the home security system 238. The security systems 238, 244 may be configured to communicate with the home network via the network router 242.

The electrified vehicle 112 provides the opportunity to export power from the vehicle 112 to the household power system. This mode of operation may be referred to as a Vehicle-to-Home (V2H) mode of operation. In this mode of operation, power may be transferred from the onboard power sources of the electrified vehicle 112 to the household power network through the bi-directional charger 240. Power may be supplied by the traction battery 124 and/or the electric machine 114 operating as a generator and powered by the engine 118. Power from the electrified vehicle 112 may be used to supplement power from the electrical grid 206 and/or as a substitute for power from the electrical grid 206.

The onboard power sources may be capable of providing up to a predetermined amount of power. For example, the traction battery 124 may have a discharge power limit that identifies a maximum amount of power that can be provided. The traction battery 124 may be characterized by a state of charge that identifies an amount of energy remaining. The discharge power limit and the state of charge may be updated periodically to reflect the current operating state of the traction battery 124. The electric machine 114 may have a power generation capability when operated as a generator (e.g., driven by the engine 118). The total power capacity of the vehicle 112 may be the sum of the traction battery discharge power limit and the amount of power that can be generated by the electric machine 114. The power capacity of the onboard power sources may not be exceeded. In a traditional household power system, the household loads may be operated at any time by activating the device. Any number of household loads may be operated at a given time. As such, the power requirement at any given time depends on the set of loads that are active. Further, the power requirement may depend on the state of operation of the household loads—transient or steady-state. Given the unpredictable nature of the power requirements it can be a challenge to ensure that the electrified vehicle 112 can reliably supply power to the household power network. One way to ensure that the electrified vehicle 112 can satisfy the power demand may be to design the power sources to accommodate the greatest possible peak power demand. This scheme may be costly as the power sources and vehicle systems must be designed to handle the peak power demand.

Another way to ensure that the electrified vehicle 112 can satisfy the power demand is to integrate the vehicle 112 as part of a home energy management system. The home energy management system may be configured to manage operation of the household loads to balance the power demand of the household loads. By balancing the power demand, the vehicle power sources may be designed to handle a predicted, nominal load level. Cost savings may be realized as the vehicle components may not have to handle the highest possible power consumption. In addition, the system may be capable of managing the loads to satisfy the power output of different vehicles. Balancing the power demand may include sequencing activation and operation of the household loads to manage the power demand at any given time.

The household loads may be configured to communicate with the network router 242. For example, each of the household loads may include a wired and/or wireless Ethernet interface for connecting to the network router 242. The household loads may communicate via one or more predetermined communication protocols. The household loads may be programmed to transmit data on the home network including predetermined operating parameters. The household loads may transmit the operating power rating for the associated device to other modules. The household loads may transmit the transient power rating for the associated device to other modules. The household loads may transmit a runtime associated with the device to other modules. The runtime may be the expected operating time of the household load. For example, the washer 218 may have a predicable runtime based on a selected wash cycle. In some cases, the runtime may be a dynamically generated parameter or may be a predicted or estimated value.

The household loads may support various IoT communication protocols and standards. The household loads may be configured to communicate via a Bluetooth interface. The household loads may be configured to communicate via a Zigbee protocol (e.g., IEEE 802.15.4). The household loads may be configured to communicate with a Z-Wave interface and protocol. The interfaces and protocols are examples of possible IoT interfaces. A household controller 250 may be configured to be in communication with the network router 242. The household controller 250 may be configured to manage operation of the household power network. The household controller 250 may implement one or more of the IoT communication protocols. In addition, the network router 242 may incorporate one or more of the IoT communication protocols. The household controller 250 may serve as a gateway between interfaces to support communication between different interfaces. The home network may include all of the supported interfaces.

The household loads may transmit a duty cycle associated with the device to other modules. The duty cycle may be a cycle time associated with the device. For example, the duty cycle may be expressed as a percentage of time that the device is expected to be operating. The household loads may transmit a load profile of the associated device to other modules. The load profile may indicate the power usage and/or current draw over an operating cycle. The load profile may indicate how the load changes (e.g., increase, decrease, stable) over the operating cycle. For example, the load profile may be provided as an expected current or power level at different times after the load is activated. The load profile may capture transient and steady state operating conditions of the load. Operating limits for the loads may be expressed as power or current levels. When the voltage level of the power network is fixed (e.g., 120 VAC), the current level differs from the power level by a factor that is the voltage level.

Other devices or modules may transmit system messages on the home network. For example, some household loads may be configured to transmit interior and exterior temperature, time, day of week. The household loads may include one or more sensors configured to provide an indication of occupancy of the home. Such data may be used by other modules for control decisions. For example, the signals may be used to predict when loads may be activated. This may be useful for load scheduling and balancing.

The household loads may be categorized based on operating priority. Each of the household loads may have an associated operating priority definition. The operating priority definition may be stored locally in the household load or externally in another controller (e.g. household controller 250). In some cases, the operating priority definition may be adjusted by the home owner. Some household loads may be categorized as interruptible loads. Interruptible loads may include loads for which power may be interrupted (e.g., reduced to zero current) for a period of time without consequence. For example, the air conditioner 210 and furnace 212 may be categorized as interruptible loads. An interruptible load may have an associated maximum time of interruption that may be transmitted to other modules.

Some household loads may be categorized as uninterruptible. These loads, once activated, may remain activated until deactivated. These may be categorized as high-priority loads. For example, the oven 226, garage door opener 234, microwave 222, and well pump 214 may be categorized as uninterruptible loads. Uninterruptible loads may be characterized as performing an operation or activity that must be completed without interruption.

Some loads may be categorized as schedulable. A schedulable load may be one whose activation time can be delayed until a more favorable time. For example, the washer 218 and dryer 216 may be categorized as schedulable loads.

Some loads may be categorized as reducible. A reducible load may include loads to which power or current can be reduced by some percentage. For example, lighting systems and an electric furnace may be categorized as reducible loads. Reducible loads may transmit a range or an amount which the power may be reduced by.

The household loads may transmit the type of load and any related parameters associated with the device to other modules. For example, if a load is reducible, the load may indicate by what percentage. An interruptible load may include a parameter indicating a maximum interruption period. Table 1 depicts an example of some household loads and their associated operating priority along with operating and inrush power specifications.

TABLE 1

Example Household Load Categorization

| Load | Priority | Operating Power (W) | Inrush Power (W) |
|---|---|---|---|
| Lighting | Reducible | 150 | 150 |
| Air Conditioner | Interruptible | 2500 | 7500 |
| Electric Furnace | Reducible | 12,000 | 12,000 |
| Gas Furnace | Interruptible | 400 | 1000 |
| Oven | Uninterruptible | 4000 | 4000 |
| Laundry | Schedulable | 450 | 1200 |
| Garage Door | Uninterruptible | 350 | 1050 |
| Microwave | Uninterruptible | 1000 | 1400 |
| Well Water Pump | Uninterruptible | 500 | 1500 |

The vehicle 112 may include a controller (e.g., controller 148) configured for energy management. The controller 148 may be configured to communicate with the home network via the network router 242 to exchange data with the household loads and/or household controller 250. The controller 148 may be configured to manage operation of the vehicle power sources and the household loads to intelligently manage the operation of the home power network.

When the vehicle controller 148 is connected to the network router 242, the management of the household power network may be distributed between the household controller 250 and the vehicle controller 148. In some configurations, the household controller 250 may manage the home power network when the vehicle 112 is not connected to the household power network. In some configurations, when the vehicle 112 is connected to the household power network, control is passed to the controller 148 of the vehicle 112. Operations to be described may be applicable to the controller 148 and to the household controller 250.

The following describes system operation that may be managed by the controller 148 in the vehicle 112. The controller 148 may register the available household loads and maintain the parameters for the household loads in non-volatile memory. For example, when first connected, the controller 148 may transmit a registration request message on the home network. The household loads may receive the registration request message and respond with registration data. The registration data may include operating parameters and historical operating characteristics associated with the household load. The communication protocol may include features for identifying each of the household loads during communication.

Once the household loads are registered and communication is established, the controller 148 may monitor operation of the household loads. The controller 148 may track which loads are operating and at what current or power level the loads are operating. The controller 148 may monitor the current demand and the actual current to detect any significant deviation between the values. The household loads may be configured to periodically transmit a message that indicates an amount of power being drawn by the associated load.

Once registered, operation of the household load may be managed by the controller 148. For example, the homeowner may activate a household load by pressing an activation button or switch. Prior to activating the household load, the household load may transmit an activation request to the controller 148. The controller 148 may compare the associated operating power rating and transient power rating to the available energy and power. If the operating power rating and the transient power rating are such that the peak power output of the electrified vehicle 112 is not exceeded, the controller 148 may respond with an activation permitted response. Note that the operations related to power rating may also be performed with current ratings (e.g., operating current rating, transient current rating). The household load may receive the activation permitted response and proceed to activate the load. Operation of the managed power system differs from a traditional household power network in that each household load no longer operates independently of one another. All activations of household loads are managed and approved by the controller 148. Under normal conditions, any delays in activation due to the communication and processing are not perceived by the user.

During operation, the home power network may be drawing some level of current or power from the vehicle power system. At some time, one of the household loads may request a change in the current demand (or power demand). For example, the household load may be requesting to be activated in response to a homeowner command. If the transient power rating of the household load is such that the peak power output of the electrified vehicle 112 would be exceeded, the controller 148 may determine if an interruptible load can be suspended to make power available. If an interruptible load is operating, the controller 148 may transmit an interrupt request to the interruptible load. The interruptible load may respond by shutting down to reduce the current draw. After confirming that the interruptible load has shut down, the controller 148 may transmit the activation permitted response to the household load which may then be activated. The operating limits of the power system may be expressed in terms of current or power.

If the operating power rating of the household load requesting activation is such that the peak power output of the electrified vehicle 112 would be exceeded, the controller 148 may determine if a reducible or interruptible load is available to reduce the power demand. If such loads are operating, the controller 148 may transmit an interrupt request to the interruptible load. The interruptible load may respond by shutting down. After confirming that the interruptible load has shut down, the controller 148 may transmit the activation permitted response to the household load which may then be activated. If a reducible load is available, the controller 148 may transmit a reduction request to the reducible load. The reducible load may respond by reducing current to the requested level.

Power consumption on the home power network may be continuously monitored by monitoring current and voltage of the power network. When power consumption or current decreases, interrupted loads may be brought back online and reduced loads may be brought back to full power. The controller 148 may send a reactivation request to interruptible loads that have been interrupted. The household loads may transmit status information via the home network. The status information may include the present current draw and the activation status. Upon deactivation, the household load may transmit a deactivation status to the controller 148.

The controller 148 may manage the household loads to minimize the instantaneous and average power consumption. Low priority household loads may be interrupted or shut off when activation of a high-priority household load is requested. The vehicle power system may be sized to handle operation of critical loads, but not necessarily for the total power load of the house 202. For example, the vehicle power system may be unable to handle the power demand if all devices and appliances are activated at the same time.

The household loads may be manually categorized according to user input. For example, the user may be able to override the categorization (e.g., priority) of the household loads under some circumstances. For example, a load categorized as reducible may include lights that are dimmed in response to a reduction request. The user may prefer that these lights not be dimmed and may manually categorize the load as uninterruptible.

Figure 3:
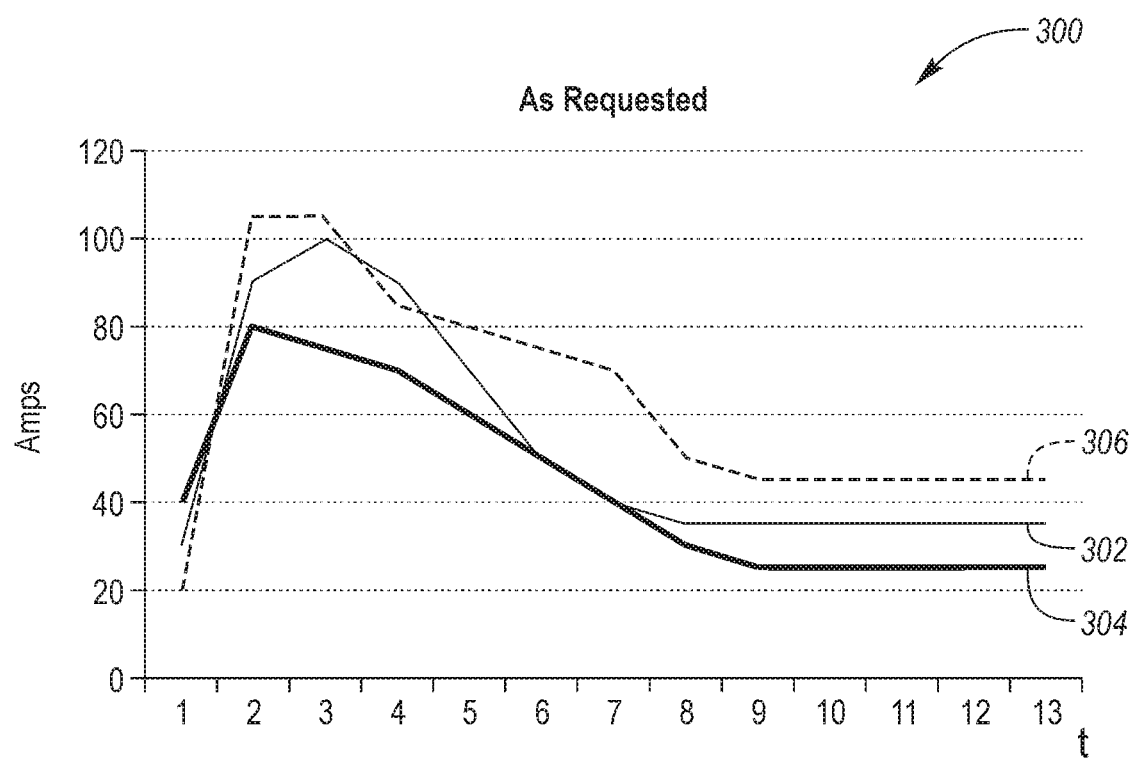
FIG. 3 depicts a graph of a possible requested current demands from household loads.

FIG. 3 depicts a possible scenario of current demand requested by three household loads. The power request graph 300 depicts a first current demand 302, a second current demand 304, and a third current demand 306. Each of the current demands may be associated with three different household loads. The timing of the current demands is such that a peak total current of approximately 280 Amps is requested. The total current demand then decreases to an operating current of approximately 105 Amps. The total current demand may be derived from a summation of the first current demand 302, the second current demand 304, and the third current demand 306 at a given time.

Figure 4:
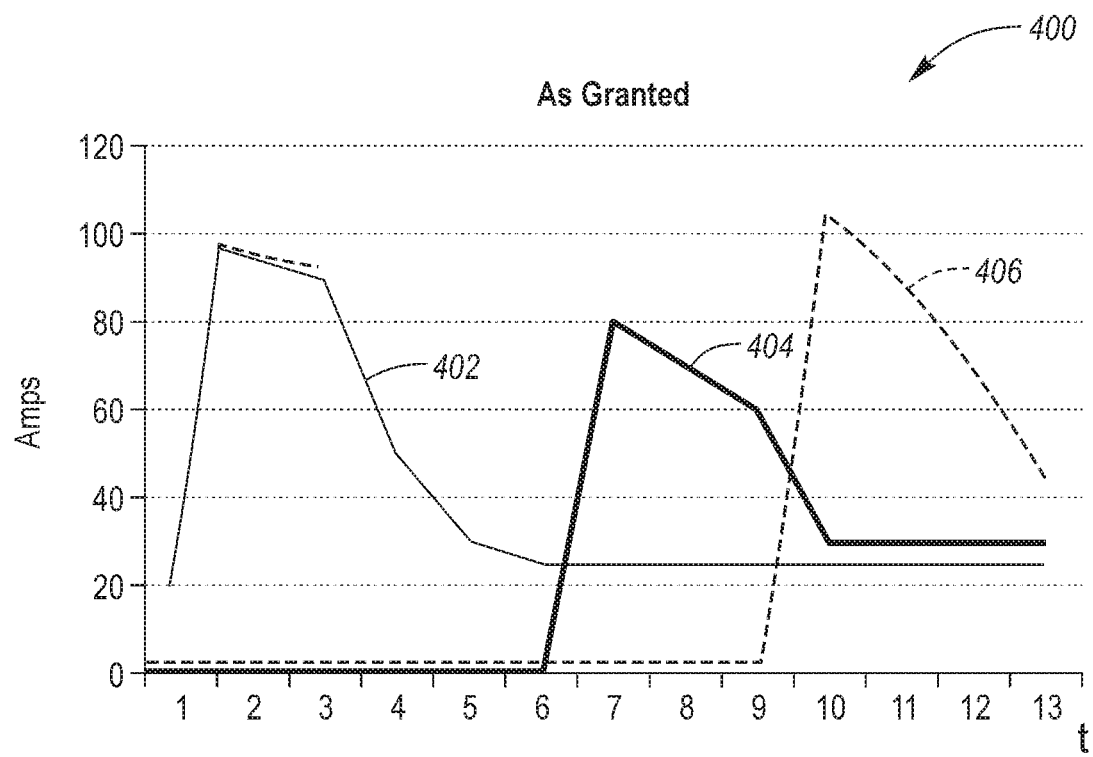
FIG. 4 depicts a graph of a possible response to the requested current demands.

FIG. 4 depicts a possible response to the requested current demand of FIG. 3. The granted current graph 400 depicts a first granted current 402, a second granted current 404 and a third granted current 406. The granted currents may correspond to the requested currents of FIG. 3. The current demand granted results in a peak total current demand of approximately 160 Amps and an operating current of approximately 105 Amps.

The controller 148 may receive the requested current demands and determine a peak total current demand. The controller 148 may then manage operation of the individual household loads to reduce the peak total current demand. The controller 148 may achieve this by staggering the activation of the household loads. In this example, the controller 148 allows the first current demand 302 to be satisfied during a first time interval. When the peak demand of the first current demand 302 is reduced (e.g., inrush current dissipates), the controller 148 may allow the second current demand 304 to be satisfied. When the peak demand of the second current demand 304 is reduced, the controller 148 may allow the third current demand 306 to be satisfied. By staggering the activation of the three loads, the peak total current demand is reduced. This allows for a smaller, less expensive vehicle power system to be used while still satisfying the household electrical demands.

Figure 5:
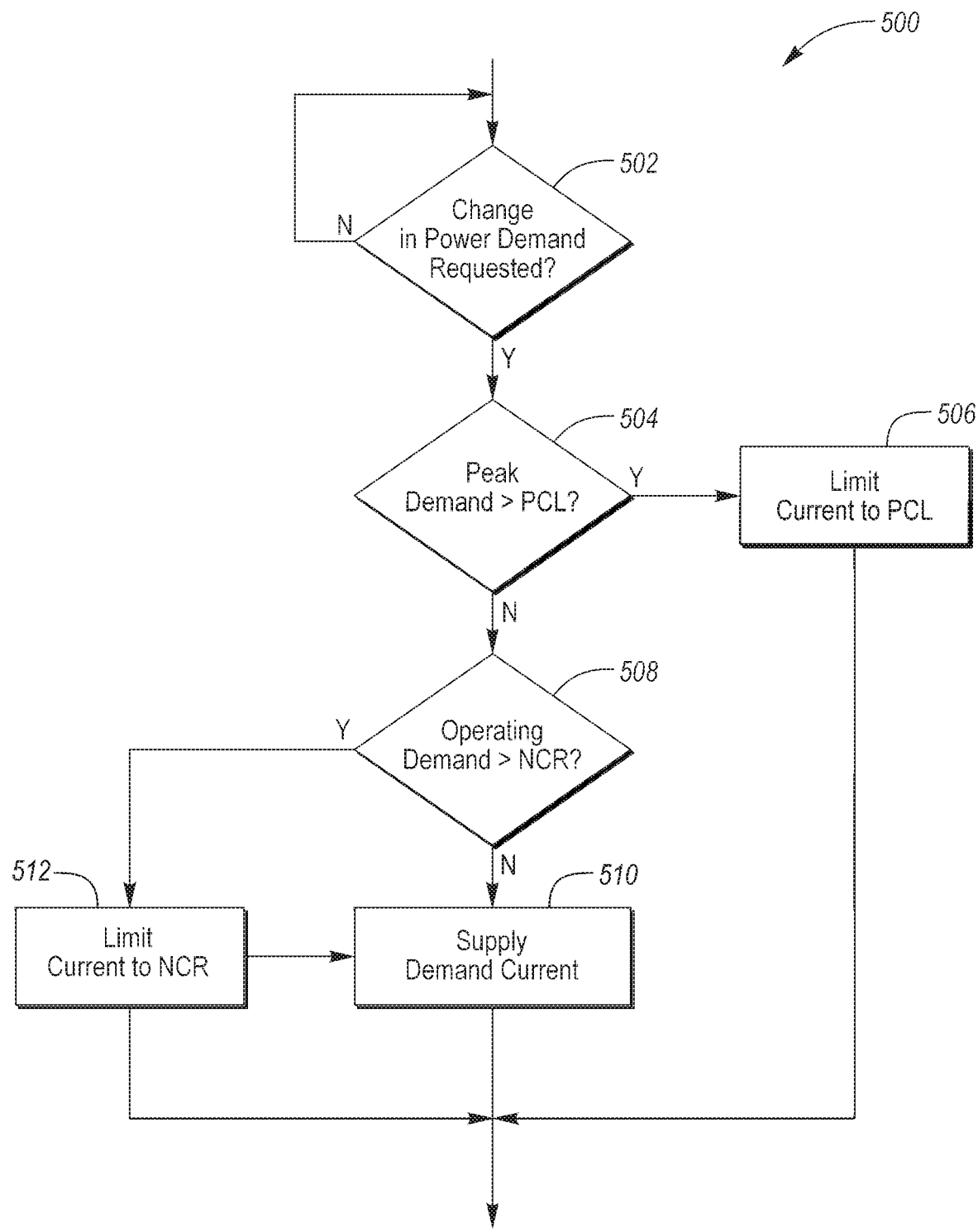
FIG. 5 depicts a flowchart for a possible set of operations for a vehicle power supply system coupled to a power network.

FIG. 5 depicts a flow chart 500 for a sequence of operation that may be implemented by the controller 148 for managing a household power system. At operation 502, the controller 148 may implement instructions to check for a change in power demand requested by one or more of the appliances. If there is no change in demand, operation 502 may be repeated. When there is no change in power demand, the appliances may continue to operate as before. If there is a change in power demand, operation 504 may be performed.

At operation 504, the controller 148 may implement instructions to compare a peak current demand to a peak current limit. Alternatively, a peak power demand may be compared to a peak power limit. The peak current limit may be a maximum current that can be satisfied by the vehicle power system. The peak demand may include a peak current demand from the appliance that is requesting the change in power demand. For example, the peak current demand may be a sum of the present operating current and the peak current demand of the requesting appliance. If the peak demand is greater than the peak current limit of the vehicle power system, operation 506 may be performed.

At operation 506, the controller 148 may implement instructions to limit current to the peak current limit. Alternatively, the controller 148 may limit power to the peak power limit of the power system. Limiting current to the peak current limit may include operating the appliances such that the demand current any given time is less than the peak current limit.

If the peak demand is less than or equal to the peak current limit at operation 504, operation 508 may be performed. At operation 508, the controller 148 may implement instructions to compare the operating demand current to a nominal current rating of the vehicle power system. If the operating current demand is greater than the nominal current rating, operation 512 may be performed. The nominal current rating may be less than the peak current limit. Alternatively, an operating demand power may be compared to a nominal power rating.

At operation 512, the controller 148 may implement instructions to limit the current demand to the nominal current rating. Limiting current to the nominal current rating may include operating the appliances such that the operating current any given time is less than the nominal current rating. Note that the power system may be able to operate for a predetermined time at current levels exceeding the nominal current rating.

If the operating current demand is less than or equal to the nominal current rating at operation 508, operation 510 may be performed. At operation 510, the controller 148 may implement instructions to supply the demanded current. In this mode, the current demand is within an acceptable operating range and the load may be activated. The controller 148 may then operate the power sources to achieve the current demand.

The effect is that, responsive to one of the appliances requesting a change in current demand predicted to cause the current to exceed the peak current limit of the power system, the controller operates the appliances to prevent the current from exceeding the peak current limit. An additional effect is that, responsive to one of the appliances requesting a change in current demand predicted to cause the current to exceed a nominal current rating of the power system, the controller schedules operation of the appliances to prevent the current from exceeding the nominal current rating for greater than a predetermined time.

Figure 6:
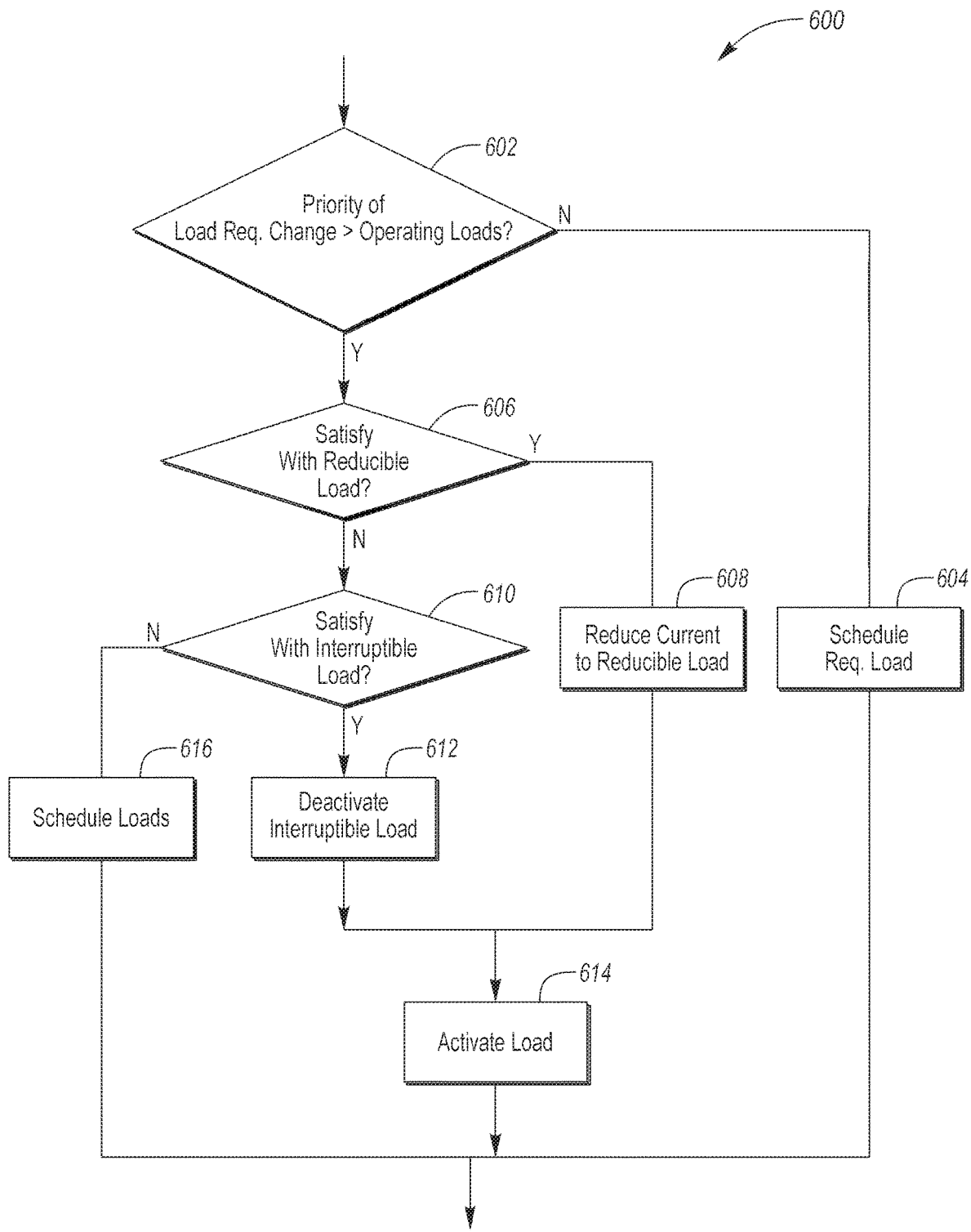
FIG. 6 depicts flowchart for a possible set of operations for satisfying a power request bases on priority of the household loads.

FIG. 6 depicts a flow chart 600 for a sequence of operation that may be implemented by the controller 148 when the current demand exceeds one of the current limits of the vehicle power system. Each of the appliances may be associated with a priority level. At operation 602, the controller 148 may implement instructions to compare priorities of the operating loads with the priority of the appliance requesting the change in current demand. If the priority of the requesting load is less than the priority of the presently operating loads, operation 604 may be performed.

At operation 604, the controller 148 may implement instructions to schedule the load requesting the change in current demand. The controller 148 may be programmed to compute an expected or predicted current demand profile for upcoming time intervals. The controller 148 may determine that sufficient capacity exists to operate the requesting load at a future time interval. The controller 148 may schedule the load to be activated at the future time interval. When the future time interval arrives, the controller 148 may check the conditions again to ensure that operation of the requesting load does not exceed any current limits of the vehicle power system.

If the priority of the requesting load is greater than at least one of the presently operating loads, operation 606 may be performed. At operation 606, the controller 148 may implement instructions to check if the current demand of the requesting load can be satisfied by reducing current to one or more of the reducible loads having lower priority. If the requested current demand can be satisfied by reducing current to one or more reducible loads, operation 608 may be performed. At operation 608, the controller 148 may implement instructions to reduce current to the one or more reducible loads. The controller 148 may schedule increasing the current to the reducible loads at a future time when the current demand is projected to be within the current limits. The requested load may then be activated at operation 614.

If the requested current demand cannot be satisfied by the reducible loads, operation 610 may be performed. At operation 610, the controller 148 may implement instructions to check if the current demand of the requesting load can be satisfied with one or more interruptible loads. If the requested current demand can be satisfied by one or more interruptible loads having lower priority, operation 612 may be performed. At operation 612, the controller 148 may implement instructions to deactivate the one or more interruptible loads. The controller 148 may also schedule reactivation of the interruptible loads at a future time when current capacity is expected to support the reactivation. The requested load may then be activated at operation 614.

If the requested current demand cannot be satisfied by the interruptible loads, operation 616 may be performed. At operation 616, the controller 148 may be programmed to schedule the loads to satisfy the current limit. Scheduling of the loads may also depend upon the current limit that is being exceeded (nominal or peak). As an example, if the peak demand including the requested change in demand exceeds the peak current limit, there may be little flexibility. Scheduling the loads may include delaying operation of the requested load to a later time when the peak current limit can be satisfied. If the operating current demand exceeds the nominal rating without the peak demand exceeding the peak current limit, there may be more flexibility in operating the loads. For example, activating the load may result in a current demand that exceeds the nominal current rating but is less than the peak current limit. The controller 148 may determine if any loads are scheduled to deactivate after a predetermined time interval. If operating the system at the current demand for the predetermined time interval is within the capability of the vehicle power system, the controller 148 may activate the requested load. If the controller 148 cannot schedule the load to activate within a predetermined time, the controller 148 may issue a notification to the user.

The controller 148 may further account for energy stored for the onboard power sources. For example, the controller 148 may schedule the loads to account for an amount of energy stored in the traction battery 124. For example, the state of charge of the traction battery 124 may be indicative of an amount of time that power can be supplied by the traction battery 124. The controller 148 may compute the amount of time and power required to operate a given household load. The controller 148 may then compare the energy required by the household load to the energy available in the onboard power sources. Based on the amount of energy available, the controller 148 may schedule operation of the household during a time that there is energy is available. The controller 148 may also be programmed to ensure that sufficient energy is available for predicted vehicle operation at a later time. If sufficient energy is not available to operate a household load for a desired amount of time, the controller 148 may notify the user of the condition.

The controller 148 may be programmed to schedule or sequence operation of the household loads to prevent the current from exceeding a peak current limit of the vehicle power system and to prevent the current from exceeding a nominal rated current of the vehicle power system for more than a predetermined time. The predetermined time may be based on the amount by which the current demand exceeds the nominal rated current of the vehicle power system. Sequencing the operation of the household loads may include delaying activation of a load that is requesting activation until a later time. Sequencing may also include deactivating one or more loads to permit activation of the requested load. Deactivated loads may be reactivated at a later time.

The controller 148 may operate the appliances to delay activation of an appliance requesting a change in current demand that would cause the current to exceed the peak current limit until the current demand predicted is less than the peak current limit. The appliance requesting the change may be of lower priority than other appliances. The controller 148 may be further programmed to, responsive to multiple appliances requesting a change in current demand due to an inrush current of each of multiple appliances within a predetermined time interval, sequence operation of the appliances to balance the current demand so that only one of the appliances demands a corresponding inrush current within the predetermined time interval. This spreads out the inrush current over time which results in a lower current or power demand.

The vehicle power system may supply power from the traction battery 124 when conditions are desirable. For example, when the state of charge exceeds a threshold. Responsive to a power demand from the appliances exceeding an amount of power that can be provided by the traction battery, the controller 148 operate the engine 118 and the electric machine 114 to generate power to satisfy the power demand.

As an example, a first appliance may be drawing current from the vehicle power system. A second appliance may be requesting activation that results an increase in the current demand. The priority of the second appliance may be greater than the priority of the first appliance. The controller 148 may predict that the increase in current demand would cause the current demand to exceed the peak current limit of the power system. For example, the inrush current of the second appliance may be of a magnitude that cause the peak current limit to be exceeded. The controller 148 may cause a reduction in current demand of a first appliance in an amount to prevent the peak current limit from being exceeded.

As another example, the first appliance and the second appliance may request activation in a same time interval. The controller 148 may activate the appliances sequentially to reduce the maximum current demand. If the second appliance has higher priority, the second appliance may be activated followed by the first appliance. The first appliance may be activated after an inrush current demand from the second appliance has dissipated. That is, the second appliance is operating at an operating current level.

The controller 148 may be programmed to sequence the operation of the appliances to minimize time intervals in which the current is between the nominal rated current and the peak current limit of the vehicle power system. The controller 148 may delay activation of appliances to achieve the result. In addition, the controller 148 may reduce current demand or interrupt current to one or more appliances to balance the current demand. The controller 148 may be programmed to operate the appliances to minimize a total peak current demand of the appliances so that a lower rated power system can be utilized.

The controller 148 may be programmed to recognize that the vehicle 112 is located in an enclosed space (e.g., garage 204) with a controllable door 236. For example, the controller 148 may recognize the condition when in communication with the garage door opener 234. If the engine 118 is started and/or running to satisfy the power demand of the home power network, the controller 148 may be programmed to request that the door 236 be opened. For example, the controller 148 may request the garage door opener 234 to open the garage door 236. In addition, the controller 148 may request activation of the garage security system 244 and/or the home security system 238. Operation of the security system 238, 244 can alert the homeowner to any security threats while the garage door 236 is opened and the engine 118 is running.

The vehicle power system and energy management system permits power sources of different power ratings to be used to power a building or other structure. The system provides intelligent control of appliances connected to the home power network so that power limits and ratings of the vehicle power sources are not exceeded. The system further redistributes current demand over time to balance the power draw while satisfying the power demand of the appliances.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a power system couplable to a power network, and including a traction battery, and an engine coupled to an electric machine; and
   a controller configured to communicate with appliances coupled to the power system and programmed to,
      responsive to the power system providing a current and one of the appliances requesting a change in current demand predicted to cause the current to exceed a peak current limit of the power system, operate the appliances to prevent the current from exceeding the peak current limit, and
      responsive to a power demand from the appliances exceeding an amount of power that can be provided by the traction battery, operate the engine and the electric machine to generate power to satisfy the power demand.

2. The vehicle of claim 1 wherein each of the appliances is associated with a priority level and the controller is further programmed to operate the appliances to delay activation of the one of the appliances until the current demand predicted is less than the peak current limit responsive to the one of the appliances having a priority level that is less than other appliances.

3. The vehicle of claim 1 wherein each of the appliances is associated with a priority level and the controller is further programmed to, responsive to the one of the appliances having a priority level that exceeds a priority level of a first appliance, reduce current to the first appliance before activating the one of the appliances.

4. The vehicle of claim 1 wherein each of the appliances is associated with a priority level and the controller is further programmed to, responsive to the one of the appliances having a priority level that exceeds a priority level of a first appliance, suspend operation of the first appliance before activating the one of the appliances.

5. The vehicle of claim 1 wherein the controller is further programmed to, responsive to one of the appliances requesting a change in current demand predicted to cause the current to exceed a nominal current rating of the power system, schedule operation of the appliances to prevent the current from exceeding the nominal current rating for greater than a predetermined time.

6. The vehicle of claim 1 wherein the controller is further programmed to, responsive to more than one of the appliances requesting a change in current demand due to an inrush current of each of the more than one of the appliances within a predetermined time interval, sequence operation of the more than one of the appliances to balance the current demand so that only one of the appliances demands a corresponding inrush current within the predetermined time interval.

7. The vehicle of claim 1 wherein the controller is further programmed to receive one or more parameters indicative of operating power requirements for the appliances, inrush power for each of the appliances, a predicted run time for each of the appliances, a duty cycle of the appliances, and a load profile for each of the appliances.

8. The vehicle of claim 1 wherein the controller is further programmed to, responsive to recognizing that the vehicle is parked in an enclosed space with a controllable door, request that the controllable door be opened while the engine is running.

9. A method comprising:
   operating a vehicle power system coupled to a power network to supply a current to appliances coupled to the power network;
   sequencing, by a controller, activation of the appliances to prevent the current from exceeding a peak current limit of the vehicle power system and to prevent the current from exceeding a nominal rated current of the vehicle power system for more than a predetermined time; and
   causing, by the controller, a reduction in current demand of a first appliance responsive to a second appliance requesting an increase in the current that is predicted to cause the current to exceed the peak current limit, wherein the second appliance has a priority level that is greater than that of the first appliance.

10. The method of claim 9 further comprising activating, by the controller, responsive to a first appliance and a second appliance requesting activation in a same time interval, the first appliance and the second appliance such that the first appliance is activated after an inrush current of the second appliance has dissipated, wherein the second appliance has a priority level that is greater than that of the first appliance.

11. The method of claim 9 further comprising sequencing, by the controller, operation of the appliances to minimize time intervals in which the current is between a nominal rated current of the vehicle power system and the peak current limit.

12. The method of claim 9 further comprising interrupting, by the controller, current demand of a first appliance responsive to a second appliance requesting activation predicted to cause the current to exceed a nominal rated current of the vehicle power system for greater than a predetermined time, wherein the second appliance has a priority level that is greater than that of the first appliance.

13. The method of claim 9 further comprising operating, by the controller, the appliances to minimize a peak current demand.

14. A vehicle power system comprising:
   a traction battery coupled to an electric machine that is drivable by an engine;
   power sources couplable to a power network; and
   a controller configured to
      communicate with appliances connected to the power network,
      responsive to the power sources providing current to the appliances and one of the appliances requesting a change in current demand predicted to cause the current to exceed a power limit of the power sources, schedule operation of the appliances to prevent the current from exceeding the power limit,
      responsive to the change in current demand exceeding a power limit of the traction battery while the engine is off, start the engine to drive the electric machine and command the electric machine to satisfy the current demand, and
      responsive to recognizing that the vehicle power system is located in an enclosed space with a controllable door, request that the controllable door be opened while the engine is running.

15. The vehicle power system of claim 14 further comprising a traction battery coupled to an electric machine that is drivable by an engine and wherein the controller is further configured to, responsive to the electric machine being operated to supply current to the power network and one of the appliances requesting a change in current demand, operate the appliances to prevent the current from exceeding a peak current limit of the traction battery and the electric machine.

16. The vehicle power system of claim 14 wherein the controller is further configured to, responsive to the one of the appliances requesting a change in current demand predicted to cause the current to exceed a nominal rated current of the power sources for a predetermined time, schedule operation of the appliances to prevent the current from exceeding the nominal rated current for greater than the predetermined time.

\* \* \* \* \*